(12) United States Patent
Yamazaki

(10) Patent No.: US 10,746,170 B2
(45) Date of Patent: Aug. 18, 2020

(54) APPARATUS AND METHOD FOR CONTROLLING RECIPROCATING PUMP

(71) Applicant: SHIMADZU CORPORATION, Kyoto-shi, Kyoto (JP)

(72) Inventor: Tomoyuki Yamazaki, Kyoto (JP)

(73) Assignee: Shimadzu Co., Kyoto (JP)

(*) Notice: Subject to any disclaimer, the term of this patent is extended or adjusted under 35 U.S.C. 154(b) by 0 days.

(21) Appl. No.: 13/893,100

(22) Filed: May 13, 2013

(65) Prior Publication Data
US 2013/0309100 A1    Nov. 21, 2013

(30) Foreign Application Priority Data

May 15, 2012    (JP) .................. 2012-111173

(51) Int. Cl.
*F04B 49/06*    (2006.01)
*G01F 11/02*    (2006.01)
(Continued)

(52) U.S. Cl.
CPC ............ *F04B 49/065* (2013.01); *F04B 13/00* (2013.01); *F04B 49/02* (2013.01); *G01F 11/029* (2013.01);
(Continued)

(58) Field of Classification Search
CPC ........ F04B 2201/02071; F04B 2205/09; F04B 2201/0207; F04B 49/065;
(Continued)

(56) References Cited

U.S. PATENT DOCUMENTS 4,994,984 A * 2/1991 Massimo .................. 702/46
6,783,335 B2 * 8/2004 Chang .................. 417/417
(Continued)

FOREIGN PATENT DOCUMENTS

JP    09-292381    11/1997
JP    2001-343371 A    12/2001

OTHER PUBLICATIONS

United Kingdom Office Action dated Dec. 2, 2013 for corresponding United Kingdom Patent App. No. 1308620.2.
(Continued)

*Primary Examiner* — Bryan M Lettman
(74) *Attorney, Agent, or Firm* — Chris Mizumoto

(57) ABSTRACT

A preparative separation-purification system has controlling apparatus, which has a pump housing for pumping liquid. The apparatus also has a moving component for reciprocating in the pump housing so as to draw a liquid into the pump housing and discharge the liquid from the pump housing and a driving source for reciprocating the moving component. A setting unit is provided for setting a target liquid supply amount or a target amount which corresponds thereto. A unit amount memory unit is provided for storing a discharge amount of the reciprocating pump per a reciprocal movement of the moving component or a unit amount which is a value corresponding to the discharge amount. A computation unit is provided for computing the smallest multiple number of the unit amount which is equal to or larger than the target amount; and a motor controller for controlling the driving source.

10 Claims, 4 Drawing Sheets

(51) Int. Cl.
*F04B 13/00* (2006.01)
*F04B 49/02* (2006.01)

(52) U.S. Cl.
CPC ............... *F04B 2201/0201* (2013.01); *F04B 2201/02071* (2013.01); *F04B 2205/09* (2013.01)

(58) Field of Classification Search
CPC .............. F04B 2201/0201; F04B 49/06; F04B 2201/0209; F04B 13/00; F04B 49/02; G01F 11/029; G01F 15/003
USPC .......................................................... 417/53
See application file for complete search history.

(56) References Cited

U.S. PATENT DOCUMENTS

| | | | | |
|---|---|---|---|---|
| 2009/0019835 A1* | 1/2009 | Dingle | ................... | F01N 11/00 60/282 |
| 2009/0132094 A1* | 5/2009 | Laverdiere | .............. | F04B 13/00 700/283 |
| 2010/0196168 A1* | 8/2010 | Kozumplik | ......... | F04B 43/0736 417/1 |
| 2010/0281958 A1* | 11/2010 | Kono | ................... | B01D 15/203 73/61.53 |
| 2011/0198272 A1* | 8/2011 | Yamazaki | .............. | G01N 30/08 210/96.1 |

OTHER PUBLICATIONS

Examination Report Received for Chinese Patent Application No. 201310180207.7 dated Jan. 16, 2015, 6 pages (1 page of English Translation & 5 pages of Official copy).

Examination Report Received for Japanese Patent Application No. 2012-111173, dated Apr. 21, 2015, 5 pages. (2 pages of English Translation and 3 pages of Official Copy).

* cited by examiner

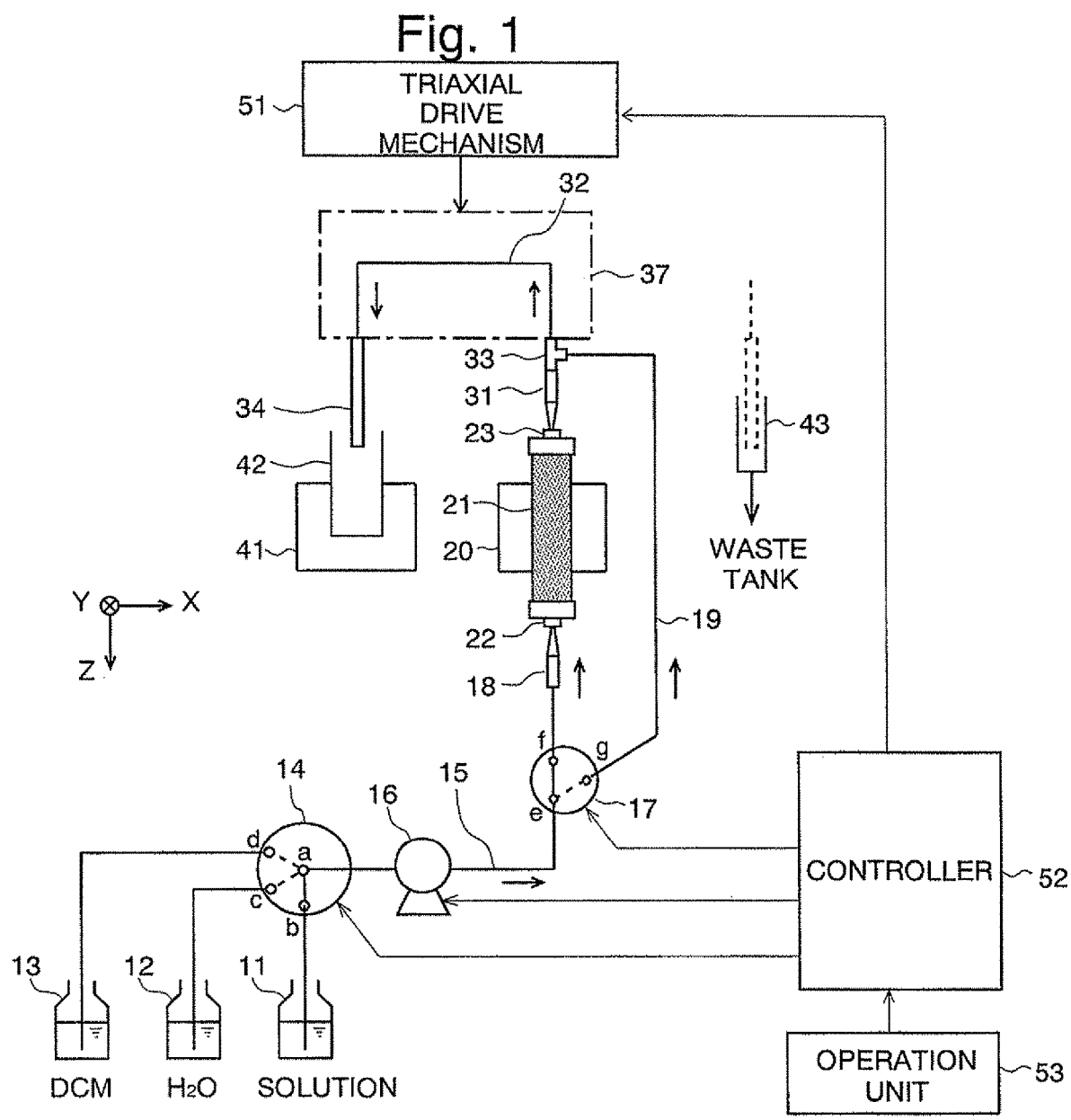

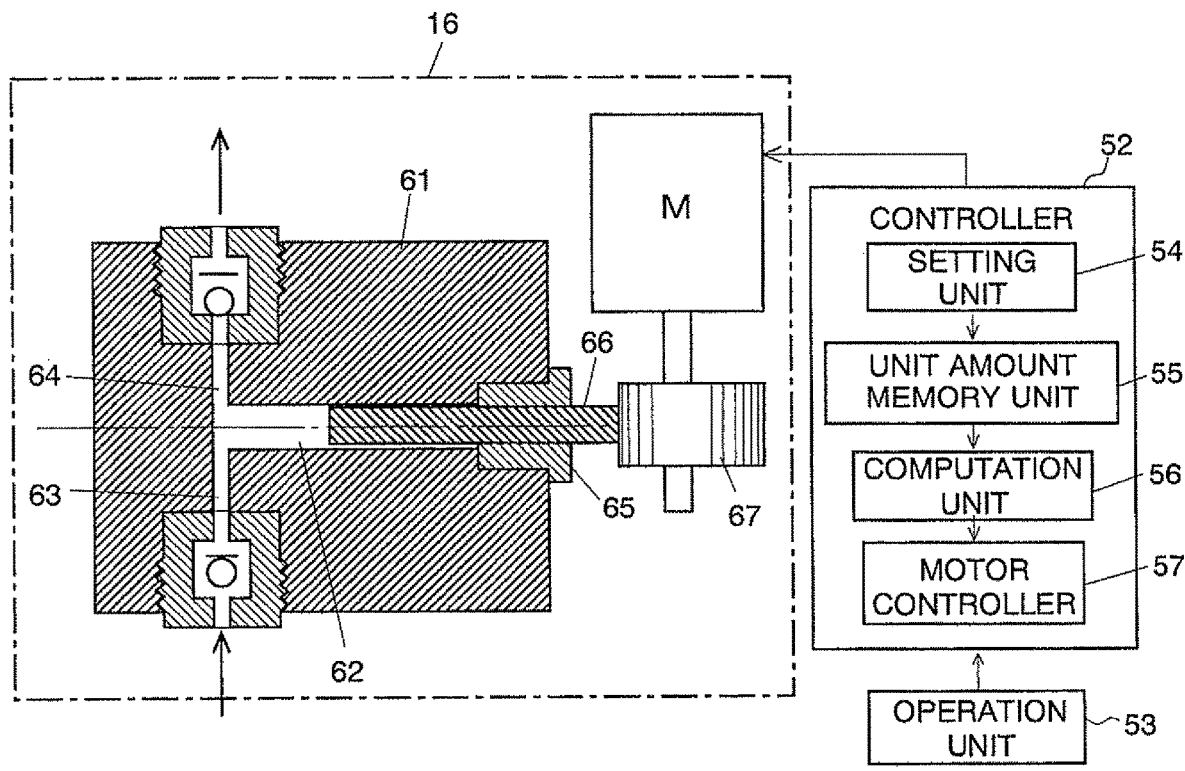

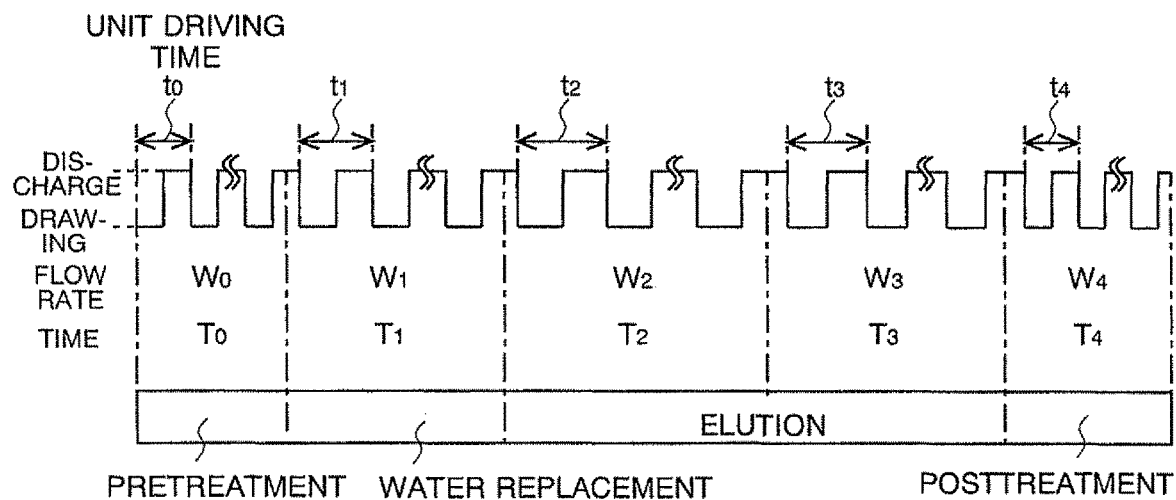
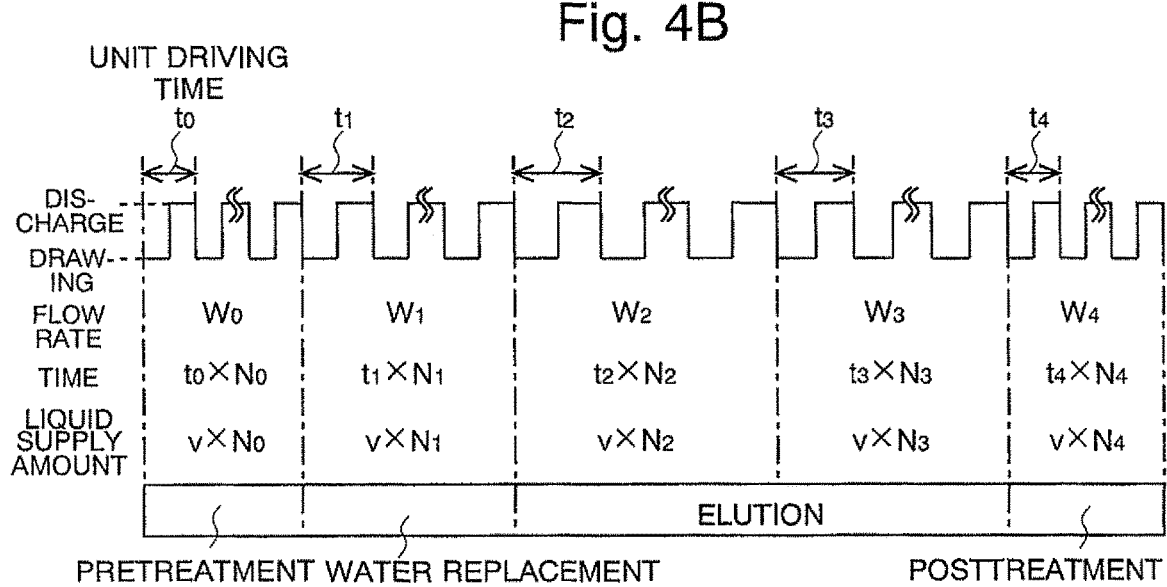

APPARATUS AND METHOD FOR CONTROLLING RECIPROCATING PUMP

TECHNICAL FIELD

The present invention relates to an apparatus and method for controlling a reciprocating pump which is used for a liquid chromatograph and other devices.

BACKGROUND ART

Reciprocating pumps draw and discharge a liquid by reciprocating a moving component such as a plunger, a piston, or a diaphragm in a pump housing such as a cylinder or a chamber. In a plunger pump 60, as shown in FIG. 6, a cylinder 62 is provided in a pump head 61, and a seal 65 is used for liquid-tight insertion of a plunger 66 into an end of the cylinder 62. The plunger 66 is reciprocally moved in the cylinder 62 with a predetermined cam profile by a motor M and a cam 67 so as to draw a liquid through a drawing port 63 and discharge it through the discharge port 64 (Patent Document 1).

Reciprocating pumps can be stably operated for a long time as they have relatively simple structure. Therefore, a reciprocating pump is often used for a delivery of a liquid for a long time in a liquid chromatograph or other devices. Reciprocating pumps include, other than a plunger pump as mentioned above, a piston pump, a diaphragm pump (membrane pump), and other pumps.

BACKGROUND ART DOCUMENT

Patent Document

[Patent Document 1] JP-A 9-292381

DISCLOSURE OF THE INVENTION

Problem to be Solved by the Invention

One usage form of a liquid chromatograph is a preparative separation-purification system in which target components separately collected by the liquid chromatograph are collected in solid form. In a preparative separation-purification system, a solution containing the target components is first sent to a trap column, where the target components in the solution are captured. Then, a cleaning liquid (which is usually water or an aqueous solution) is sent to the trap column. The cleaning liquid is retained in the trap column so as to dissolve undesired substances such as salts or other substances in the cleaning liquid. Subsequently, an eluting solvent is sent to the trap column so as to push out the cleaning liquid retained in the trap column. The eluting solvent is retained in the trap column. The target components captured in the trap column are eluted into the eluting solvent. After that, more eluting solvent is sent to the trap column, so that the eluting solvent into which the target components in the trap column have been eluted is ejected from the trap column. The ejected eluting solvent is sent to a collection container. Lastly, the collection container is heated or centrifuged under a vacuum to collect the target components in solid form.

The aforementioned preparative separation-purification system requires a predetermined amount of liquid to be sent in some steps such as: the step of sending a cleaning liquid to the trap column, the step of sending the eluting solvent into the trap column to replace the cleaning liquid retained in the trap column with the eluting solvent, the step of sending more eluting solvent to deliver the eluting solvent into which the target components have been eluted in the trap column to the collection container. To send a predetermined amount of liquid, generally, the flow rate (the liquid supply amount per unit time) of a pump is obtained (or set) in advance, and the pump is activated for the time obtained by dividing the predetermined amount by the flow rate.

However, in the case of a reciprocating pump, even if a pump is activated for the period of time computed as described above, the liquid supply amount may vary, which impedes a correct operation such as the replacement of the cleaning liquid.

The problem to be solved by the present invention is to provide a controlling apparatus and a controlling method which can reduce the variation of the liquid supply amount of the reciprocating pump as much as possible.

Means for Solving the Problem

To solve the aforementioned problem, the present invention provides a controlling apparatus for a reciprocating pump having: a pump housing; a moving component for reciprocating in the pump housing so as to draw a liquid into the pump housing and discharge the liquid from the pump housing; and a driving source for reciprocating the moving component, including:

a setting unit for setting a target liquid supply amount or a target amount which corresponds thereto;

a unit amount memory unit for storing a discharge amount of the reciprocating pump per a reciprocal movement of the moving component or a unit amount which is a value corresponding to the discharge amount;

a computation unit for computing a smallest multiple number of the unit amount which is equal to or larger than the target liquid supply amount or the target amount; and a motor controller for controlling the driving source so as to reciprocate the moving component a same number of times as the smallest multiple number.

In a reciprocating pump, a moving component reciprocates in a pump housing so as to repeat the cycle of drawing and discharging a liquid. If the moving component starts moving from any point and stops at any position in the pump housing, the timing of drawing and that of discharge change every time the reciprocating pump is activated, which causes the supply flow amount to vary. The variation of the supply flow amount occurs, with respect to the target liquid supply amount, within the following range:

$$W \times \{C(V/v)-1\} < V' \leq W \times C(V/v) \quad (1),$$

where V represents the target liquid supply amount, v represents the discharge amount (unit discharge amount) of the reciprocating pump per a reciprocal movement of the moving component, W represents the flow rate of the reciprocating pump (the liquid supply amount supplied from a pump per unit time), V' represents the actual liquid supply amount, $C(\bullet)$ is a ceiling function, and $C(x)$ means that the figures of x after the decimal point are to be rounded up.

If the liquid supply amount varies as shown by the expression (1), the liquid supply amount can possibly be smaller than the target liquid supply amount. As previously described, various operations are performed in a preparative separation-purification system, such as the replacement of a cleaning liquid in a trap column by an eluting solvent. If the liquid supply amount is smaller than the target liquid supply amount, the cleaning liquid may remain in the trap column. In this case, undesired substances might be mixed into the collected target components.

In contrast, in the controlling apparatus according to the present invention, the reciprocating pump is made to activate the same number of times as the smallest multiple number of the unit amount so that the liquid supply amount is equal to or more than the target amount. Accordingly, when the reciprocating pump stops, a moving component stops at the same position at which the moving component starts moving. Therefore, activations of the reciprocating pump do not change the timing of drawing and that of discharge. Hence, the liquid supply amount does not vary as shown by the expression (1). The smallest multiple number is expressed by $C(V/v)$, where V denotes the target liquid supply amount and v denotes the unit discharge amount. The liquid supply amount is expressed by $W \times C(V/v)$, where W denotes the flow rate. Since this liquid supply amount will be equal to or more than the target liquid supply amount V, operations in the preparative separation-purification system such as the replacement of the cleaning liquid as previously described are correctly performed.

The unit discharge amount v may slightly vary depending on the usage environment and other factors of the reciprocating pump. In anticipation of this change, when computing the smallest multiple number, it is preferable to obtain a number which is slightly larger (safer) than $V/v$. To this end, an expression such as $C(V/v+\alpha)$ (where $\alpha>0$: e.g. $\alpha=0.5$) or $C(V/v \times \beta)$ (where $\beta>1$: e.g. $\beta=1.1$) may be used.

When the flow rate of the reciprocating pump is constant, the time for which the reciprocating pump is activated can be computed by dividing the target liquid supply amount by the flow rate as previously described. In this case, this time can be used as the value which corresponds to the target liquid supply amount.

The target amount may be set by a user's input or based on data received from another controlling apparatus.

In the case where the flow rate of the reciprocating pump is constant, the time (unit driving time) required for the moving component to make a reciprocal movement (i.e. a cycle movement) can be set as the value which corresponds to the discharge amount (unit discharge amount) of the reciprocating pump per a reciprocal movement of the moving component.

To solve the aforementioned problem, the present invention provides a controlling method for a reciprocating pump having: a pump housing; a moving component for reciprocating in the pump housing so as to draw a liquid into the pump housing and discharge the liquid from the pump housing; and a driving source for reciprocating the moving component, including the steps of:

setting a target liquid supply amount or a target amount which corresponds thereto;

computing, based on a discharge amount of the reciprocating pump per a reciprocal movement of the moving component or a unit amount which is a value corresponding to the discharge amount, a smallest multiple number of the unit amount which is equal to or larger than the target amount; and controlling the driving source so as to reciprocate the moving component a same number of times as the smallest multiple number.

Effects of the Invention

With the controlling apparatus and the controlling method for a reciprocating pump according to the present invention, when the reciprocating pump stops, a moving component stops at the same position at which it started moving. Therefore, activations of the reciprocating pump do not change the timing of drawing and that of discharge, which can reduce the variation of the liquid supply amount.

BRIEF DESCRIPTION OF THE DRAWINGS

FIG. 1 shows a schematic configuration diagram of a preparative separation-purification system having a reciprocating pump controlling apparatus according to an embodiment of the present invention.

FIG. 2 shows a schematic diagram of a reciprocating pump and a reciprocating pump controlling apparatus according to the present embodiment.

FIG. 3A is a table showing a unit discharge amount as a unit amount stored in the unit amount memory unit, and FIG. 3B is a table showing unit driving times as a unit amount stored in the unit amount memory unit and showing the corresponding relationship between the unit driving time and the flow rate.

FIG. 4A is a conventional timing diagram showing the timings of drawing and discharge of a reciprocating pump, and FIG. 4B is a timing diagram showing the timings of drawing and discharge of a reciprocating pump controlled by the controlling apparatus according to the present embodiment.

BEST MODES FOR CARRYING OUT THE INVENTION EMBODIMENT

Figure 5:
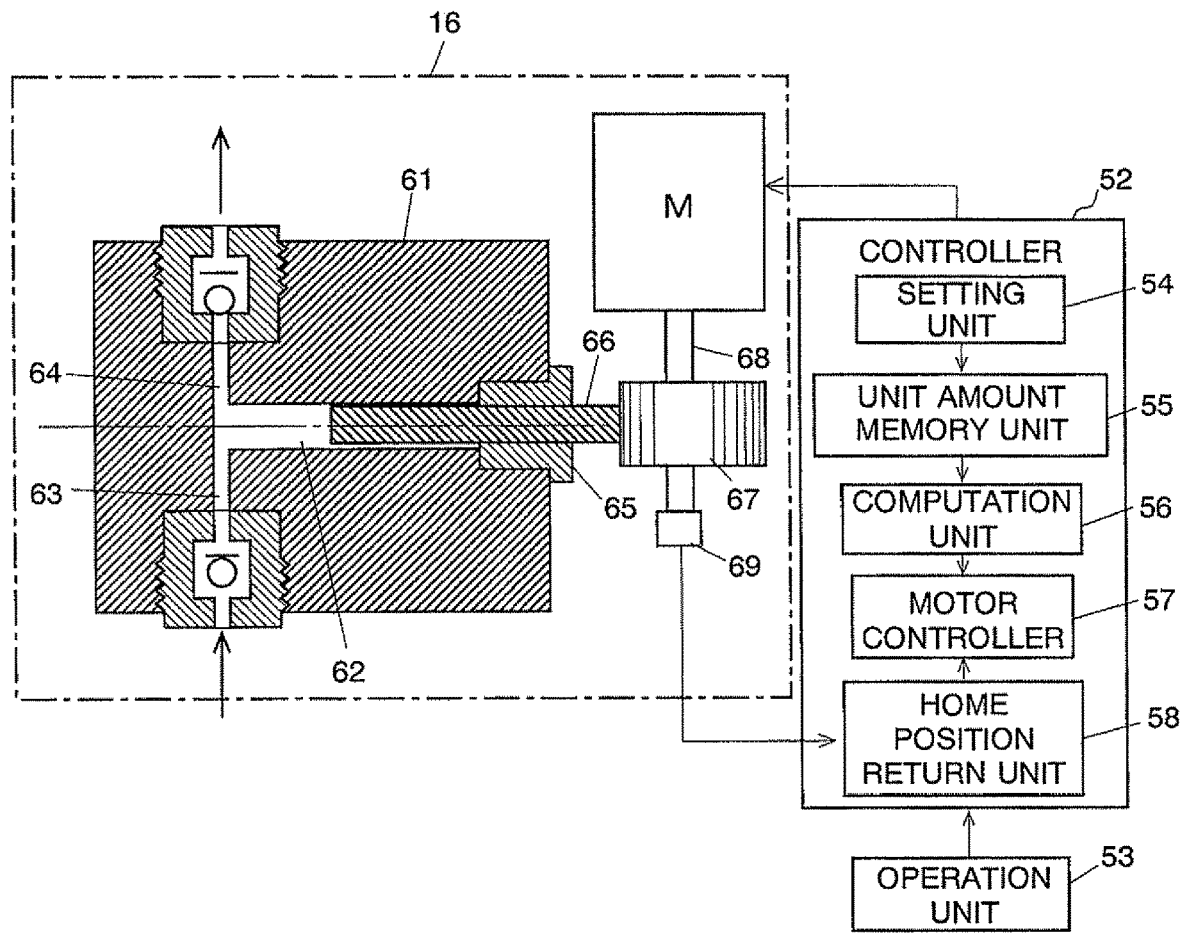
FIG. 5 is a schematic configuration diagram showing a modification example of the reciprocating pump and the controlling apparatus for the reciprocating pump.
Figure 6:
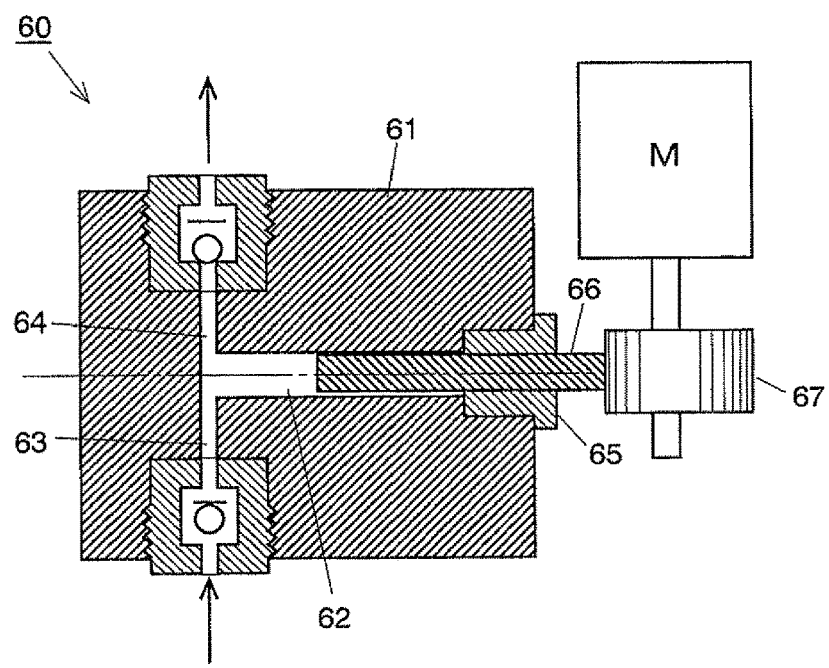
FIG. 6 shows an example of the structure of a reciprocating pump.

FIG. 1 shows a preparative separation-purification system having a controlling apparatus for a reciprocating pump according to an embodiment of the present invention. The preparative separation-purification system of FIG. 1 is used for purificating the target component which has been separately collected in advance in a separation-collection liquid chromatograph (not shown) to obtain it in solid form. Alternatively, the separation-collection liquid chromatograph may be directly connected to the previous stage of the preparative separation-purification system so that the solution containing the target component which has been separated in the separation-collection liquid chromatograph is directly introduced into the preparative separation-purification system.

In FIG. 1, a solution which contains target component and which has been separately collected in advance as previously described is contained in the solution container 11. The solvent of the solution is mainly the mobile phase used in the separation-collection liquid chromatograph. A wash solution container 12 holds pure water acting as the cleaning liquid for washing the column. The solvent container 13 holds dichloromethane (which is labeled as "DCM" in the figure) acting as the solvent (eluting solvent) for eluting the target component and as a dilution liquid for diluting the elute from the column. A first selector valve 14, which is a three-way selector valve, is provided to change the passage configuration so that one of the liquids held in the containers 11, 12, and 13 is selectively supplied to a supply passage 15. Tubes for drawing the liquid from a solution container 11, a wash solution container 12, and a solvent container 13 are respectively connected to ports b, c, and d of the first selector valve 14. One end of the supply passage 15 is connected to the port a of the first selector valve 14, while the other end of the supply passage 15 is connected to the base of a first needle 18 which is made by a cylindrical needle with a pointed end. A supply pump (reciprocating pump) 16 for drawing and sending a liquid at a predetermined flow rate is provided on the supply passage 15. A second selector valve 17, which is a two-way selector valve, is provided between the supply pump 16 and the first needle 18. This detail of this configuration will be described later.

In a column rack 20, a plurality of trap columns 21 which are filled with a filler for trapping target components are aligned and held in a direction perpendicular to the plane of the document (e.g. in the Y-axis direction in the figure). In the column rack 20, each trap column 21 is held in a substantially vertical position. The inlet end, to which the supply passage 15 is connected, is directed downwards, while the outlet end, to which a collection passage 32 (which will be described later) is connected, is directed upwards.

The liquid which has passed through the trap column 21 passes through the collection passage 32. One end of the collection passage 32 is connected to the base of a second needle 31 which is composed of a cylindrical needle with a pointed end, while its other end is connected to the base of a discharge nozzle 34, which has a cylindrical shape.

A plurality of collection containers 42 for collecting the separated and purified target components are held in a container rack 41 in the direction perpendicular to the plane of the document at intervals corresponding to those of the plurality of trap columns 21. The liquid discharged from the tip of the discharge nozzle 34 drips into any one of the plurality of collection containers 42.

The collection passage 32, the second needle 31, and the discharge nozzle 34 are attached to a fraction collector head 37. The fraction collector head 37 can be moved vertically (i.e. in the Z-axis direction in the figure) and horizontally (i.e. in the X-axis and Y-axis directions in the figure) by a triaxial drive mechanism 51. By horizontally moving the fraction collector head 37, the second needle 31 can be moved above a desired trap column 21 among the plurality of trap columns 21 held in the column rack 20, and the discharge nozzle 34 can be moved above the collection container 42 contained at the position corresponding to the selected trap column 21 in the container rack 41. In this state, the fraction collector head 37 is moved down. This inserts the tip of the second needle 31 into the needle port 23 provided at the outlet end of the trap column 21, thereby connecting the collection passage 32 to the outlet end, and simultaneously places the tip of the discharge nozzle 34 inside the collection container 42 so that a liquid can drip into the collection container 42. A disposal port 43 including a liquid reservoir and a disposal passage which is connected to a waste tank (not shown) is provided in the moving range of the fraction collector head 37 by means of the triaxial drive mechanism 51.

The first needle 18 can be vertically and horizontally moved by means of a moving mechanism (not shown). The supply passage 15 can be connected to the inlet end of the trap column 21 by moving the first needle 18 below a desired trap column among the plurality of trap columns 21 held in the column rack 20, and moving up the first needle 18 so that the tip of the needle 18 is inserted into the needle port 22 provided at the inlet end of the trap column 21.

A dilution passage 19 is connected to the second selector valve 17 provided on the aforementioned supply passage 15. The second selector valve 17 is provided to change the passage configuration so that the liquid drawn by the supply pump 16 is selectively supplied to either the trap column 21 or the dilution passage 19. The pipe extending from the supply pump 16 (i.e. the upstream portion of the supply passage 15) is connected to the port e, the pipe leading to the first needle 18 (i.e. the downstream portion of the supply passage 15) is connected to the port f, and one end of the dilution passage 19 is connected to the port g. The other end of the dilution passage 19 is connected to the collection passage 32 by way of a T-joint 33 provided in the vicinity of the second needle 31. This allows a liquid (i.e. dilution liquid) which passes through the dilution passage 19 to flow into the collection passage 32.

A controller 52 including a central processing unit (CPU) and other components automatically performs a preparative separation-purification task by switching the first selector valve 14 and the second selector valve 17, controlling the operation of the supply pump 16 (flow volume and/or flow speed), setting the driving operation of the triaxial drive mechanism 51, and performing other operations according to a previously prepared program. That is, the controller 52 also functions as the apparatus for controlling a reciprocating pump of the present invention (FIG. 2). The conditions for the preparative separation-purification task and other information are input and set through an operation unit 53 by a user.

The automatic preparative separation-purification process using the preparative separation-purification system of the present embodiment is hereinafter described. To capture the target component onto the filler in the trap column 21, the controller 52 initially connects the solution container 11 (port b) and the supply passage 15 (port a) via the first selector valve 14, and connects the supply passage 15 (port e) and the first needle 18 (port f) via the second selector valve 17. In this state, the supply pump 16 is energized to supply a liquid at a predetermined constant flow rate for a predetermined time. The control of the supply pump 16 by the controller 52 will be described later. In this stage, the first needle 18 is connected to the needle port 22 provided at the inlet end of a predetermined trap column 21, the second needle 31 is connected to the needle port 23 provided at the outlet end of the trap column 21, and the discharge nozzle 34 is inserted into the disposal port 43.

The supply pump 16 draws the solution from the solution container 11 and delivers it through the net end into the trap column 21. Then, the target component in the solution is captured by the filler in the trap column 21. The mobile phase from which the target component has been removed exits from the outlet end, to be disposed of via the collection passage 32 and discharge nozzle 34 to the disposal port 43.

After the solution is supplied into the trap column 21 for a predetermined period of time or until the solution prepared in the solution container 11 is exhausted, the controller 52 switches the first selector valve 14 to connect the wash solution container 12 (port c) and the supply passage 15 (port a). Then, the supply pump 16 draws pure water from the wash solution container 12 and delivers it through the inlet end into the trap column 21. By this process, any unwanted water-soluble substance (e.g. salt) adhered to the filler in the previous process of capturing the target component is removed from the inside of the trap column 21, to be disposed of via the collection passage 32 and discharge nozzle 34 to the disposal port 43. As a result of supplying the pure water, the mobile phase remaining in the trap column 21 immediately before the initiation of the water supply is replaced with water, and this water eventually fills the trap column 21. The target component captured on the filler can barely elute into water due to a strong adsorption effect.

Therefore, at this point in time, the target component is still captured in the trap column 21 (Pretreatment Step).

Subsequently, the controller 52 switches the first selector valve 14 to connect the solvent container 13 (port d) and the supply passage 15 (port a). Then, the supply pump 16 draws an eluting solvent (dichloromethane) from the solvent container 13 and delivers it through the inlet end into the trap column 21 (Water-Replacement Step).

When the eluting solvent is supplied into the trap column 21, the target compounds which have been captured on the filler start to be eluted into the eluting solvent. Accordingly, taking into account the void volume (i.e. the volume of the water held in the trap column 21 immediately before the introduction of dichloromethane) and the flow rate of dichloromethane supplied by the supply pump 16, for example, the controller 52 calculates the time required for completely disposing the water. When this predetermined time has elapsed from the initiation of the supply of the eluting solvent, the discharge nozzle 34 is removed from the disposal port 43 and inserted into a predetermined collection container 42 to initiate the preparative separation of the target components. By this process, the elute containing the target components which have passed through the collection passage 32 are dripped from the discharge nozzle 34 and collected in a predetermined collection container 42 (Elution Step).

Dichloromethane has a strong elution power. Therefore, substantially at the same time when the eluting solvent starts to be discharged from the outlet end of the trap column 21, the elute containing the target component at high concentration starts to flow through the collection passage 32. Hence, in a conventional apparatus, the target components easily deposit in the passage, which may clog the pipes and valves, impeding the smooth flow of the elute. In contrast, in the system of the present embodiment, the elute in the collection passage 32 is diluted using the dilution passage 19 as previously described. Hence, it is possible to suppress the deposit of the target components in the portion at the downstream of the outlet end of the trap column 21, which can prevent the passage in this downstream portion from being clogged. That is, during a predetermined time period from the point in time when the eluting solvent starts to be ejected from the outlet end of the trap column 21, the controller 52 controls the second selector valve 17 so as to intermittently change the passage from the first needle 18 (port f) to the dilution passage 19 (port g). Switching the second selector valve 17 to the dilution passage 19 enables the dichloromethane drawn by the supply pump 16 to flow directly into the collection passage 32 without passing through the trap column 21.

As a result, the elute containing the target component at high concentrations is diluted by the dilution liquid, which makes it difficult for the deposition of the target component to occur in the collection passage 32. That is, the dichloromethane held in the solvent container 13 in the present embodiment acts both as the eluting solvent for eluting the target components from the trap column 21 and as the dilution liquid for diluting the elute in the collection passage 32.

The intermittent introduction of the dilution liquid as previously described causes the alternate flow of the elute (i.e. dichloromethane containing the target component) introduced from the trap column 21 and the dilution liquid (i.e. dichloromethane not containing the target components) introduced from the dilution passage 19. Hence, even if the target components deposit in the elute while the elute is flowing through the collection passage 32 and adhere to the insides of the pipe and valve, the deposits can be dissolved by the dilution liquid which will flow subsequently. This can efficiently prevent the passage from being clogged.

For the intermittent supply of the dilution liquid as described above, the user can set in advance appropriate values for the interval between the supplies of the dilution liquid and the time duration of each supply. Increasing the ratio of the liquid supply amount of the dilution liquid with respect to that of the eluting solvent increases the effect of the prevention of the deposit of target components. However, since this causes much dilution liquid to be mixed into the elute which has been separately collected in the collection container 42, the drying process for the target component will take a long time. Hence, it is preferable to decrease the liquid supply amount of the dilution liquid as long as the clog of the passage does not occur.

The amount of the target component trapped on the filler in the trap column 21 is limited. Therefore, after some time has elapsed from the initiation of the introduction of dichloromethane into the trap column 21, the concentration of the target component contained in the elute decreases. Therefore, after a predetermined period of time has elapsed from the initiation of the preparative separation or when the supply of a predetermined amount of dichloromethane has finished, the controller 52 takes out the discharge nozzle 34 from the collection container 42 and inserts it into the disposal port 43 again to finish the preparative separation process. Subsequently, the controller 52 switches the first selector valve 14 so as to connect the wash solution container 12 (port c) and the supply passage 15 (port a). Accordingly, the pure water held in the wash solution container 12 is drawn by the supply pump 16 and flows through the trap column 21, the collection passage 32, and the discharge nozzle 34 in order to rinse them (Posttreatment Step).

After the elutes containing different target components are collected in each collection container 42, the elutes may be heated or centrifuged under a vacuum to collect the target components in solid form.

The automatic preparative separation-purification operation of the preparative separation-purification system shown in FIG. 1 includes the pretreatment step, the water-replacement step, the elution step, and the posttreatment step, as previously described. The appropriate values of the flow rate and the liquid supply amount of the supply pump 16 are different in these steps, and therefore it is necessary to set the suitable flow rate and target amount for each step. The "target amount" to be set is a target liquid supply amount or a target liquid supply time.

As shown in FIG. 2 the controller 52 of the present embodiment includes, as function blocks, a setting unit 54, a unit amount memory unit 55, a computation unit 56, and a motor controller 57. The setting unit 54 is provided for setting the flow rate and the target amount of the supply pump 16 for each of the steps. The flow rate and the target amount may be set by a user's operation through the operation unit 53 or based on the data delivered from another controlling apparatus which is not shown in FIG. 1 or 2.

The unit amount memory unit 55 stores the unit amount per cycle of drawing-discharge of the supply pump 16. The unit amount stored in the unit amount memory unit 55 may be a discharge amount (unit discharge amount) per reciprocation (a cycle) of the plunger 66 (FIG. 3A) or a driving time (unit driving time) per reciprocation of the plunger 66 in relation to a flow rate (FIG. 3B). Since the following relationship:

$$t = v/W \quad (2)$$

holds among the flow rate W, the unit discharge amount v, and the unit driving time t, the unit amount memory unit 55 has only to store either the unit discharge amount v or the unit driving time t, although it can store the both.

The computation unit 56 is provided for computing the smallest multiple number of the target amount set by the setting unit 54. In the case where a liquid supply amount (target liquid supply amount) V has been set by the setting unit 54 and a unit discharge amount v is stored as the unit amount in the unit amount memory unit 55, the computation unit 56 computes N from the formula:

$$N = C(V/v) \quad (3),$$

where C(•) is a ceiling function, and C(x) means that the figures of x after the decimal point are rounded up. In the case where the time (target liquid supply time) T is used as the target amount and the unit driving time t is stored as the unit amount in the unit amount memory unit 55, the computation unit 56 computes N from the formula:

$$N = C(T/t) \quad (4).$$

Since the relationship of the formula (2) holds among the flow rate W, the unit discharge amount v and the unit driving time t, and the relationship of $$T = V/W \quad (5)$$

holds among the target liquid supply time T, the flow rate W, and the target liquid supply amount V, the formulas (3) and (4) are the same. Of course, the multiple number N can be expressed by formulas other than formulas (3) and (4), based on the relationship between the formulas (2) and (5).

The unit amount for the supply pump 16 may vary depending on the usage environment and other factors. Given this, it is preferable in actuality to use the following formula to compute N in consideration of this variation:

$$N = C(V/v \times \beta) \quad (3)',$$

where β(>1) is a safety coefficient (e.g. β=1.1).

The data of the multiple number N computed by the computation unit 56 are sent to the motor controller 57. The motor controller 57 controls the motor M so that the plunger 66 reciprocates N times at the rotation rate corresponding to the flow rate W which has been set by the setting unit 54.

FIGS. 4A and 4B are timing diagrams of the drawing-discharge of the supply pump 16 for the flow rate and the target liquid supply amount (or the target liquid supply time) set by the setting unit 54. FIG. 4A shows a case where the supply pump 16 is activated without computing the multiple number N, and FIG. 4B shows a case where the pump is controlled using the multiple number N computed by the computation unit 56.

As shown in FIG. 4A, in each step, the timing at which the supply pump 16 starts moving and finishes moving is random in a drawing-discharge cycle of the supply pump 16. Consequently, in the water-replacement step for example, the actual liquid supply amount varies between v×(N1−1) and v×N1 (where N1 is a value computed by the formula (3) based on the target liquid supply amount V1), compared to the target liquid supply amount V1. Since the following relationship holds:

$$v \times (N1-1) < V1 \leq v \times N1 \quad (6),$$

the actual liquid supply amount might be smaller than the target liquid supply amount V1. In this case, when the water in the trap column is replaced by an eluting solvent in the water-replacement step, some water remains in the trap column.

In contrast, in the case of FIG. 4B, the timings of the initiation of the movement and the termination of the movement of the supply pump 16 are the same in a cycle for any of the steps. Consequently, in the water-replacement step for example, the actual liquid supply amount is v×N1 rather than the target liquid supply amount V1. That is, a variation in the liquid supply amount as shown by the expression (6) does not occur. In addition, as indicated by the expression (6), the actual liquid supply amount is equal to or more than the target liquid supply amount V1. This means that in the water-replacement step, all the water held in the trap column can be replaced by an eluting solvent. Further, since the increment in the actual liquid supply amount with respect to the target liquid supply amount of the eluting solvent can be minimized, the decrement in the target component due to an excessive flow of the eluting solvent can be minimized.

FIG. 5 shows a modification example of the reciprocating pump and the controlling apparatus for the reciprocating pump. In this modification example, a rotary encoder 69 in the rotation axis 68 of the motor M and a home position return unit 58 in the controller 52 are provided in addition to the configuration of FIG. 2.

Every time the preparative separation-purification system is activated, the home position return unit 58 reads out a signal from the rotary encoder 69 to obtain the rotation angle of the rotation axis 68 at the activation of the system. If this rotation angle is different from a predetermined initial angle, the home position return unit 58 drives the motor M so that the rotation angle of the rotation axis 68 conforms to the initial angle. Therefore, even if the moving initial position of the plunger 66 is changed due to a cessation of the preparative separation-purification system from an electric power failure or an emergency stop of the system, for example, the moving initial position can be returned to the predetermined position.

It should be noted that the embodiment described thus far is merely an example of the present invention, and it is evident that any change, modification or addition made within the spirit of the present invention is also included in the scope of the claims of the present application.

EXPLANATION OF NUMERALS

11 . . . Solution Container
12 . . . Wash Solution Container
13 . . . Solvent Container
14 . . . First Selector Valve
15 . . . Supply Passage
16 . . . Supply Pump
17 . . . Second Selector Valve
18 . . . First Needle
19 . . . Dilution Passage
20 . . . Column Rack
21 . . . Trap Column
22, 23 . . . Needle Port
31 . . . Second Needle
32 . . . Collection Passage
33 . . . T-Joint
34 . . . Discharge Nozzle
37 . . . Fraction Collector Head
41 . . . Container Rack
42 . . . Collection Container
43 . . . Disposal Port 51 ... Triaxial Drive Mechanism
52 ... Controller
53 ... Operation Unit
54 ... Setting Unit
55 ... Unit Amount Memory Unit
56 ... Computation Unit
57 ... Motor Controller
58 ... Home Position Return Unit
60 ... Plunger Pump
61 ... Pump Head
62 ... Cylinder
63 ... Drawing Port
64 ... Discharge Port
65 ... Seal
66 ... Plunger
67 ... Cam
68 ... Rotation Axis
69 ... Rotary Encoder

The invention claimed is:

1. A preparative separation-purification system comprising:
a solution container;
at least one trap column;
a reciprocating pump having a pump housing;
a moving component for reciprocating in the pump housing so as to draw a liquid into the pump housing and discharge the liquid from the pump housing, wherein the moving component starts moving from any position which varies within its range of motion;
a driving source for reciprocating the moving component; and
a controlling apparatus including:
a setting section configured to set a target liquid supply amount;
a unit amount memory section configured to store a discharge amount of the reciprocating pump per a reciprocal movement of the moving component;
a computation section configured to compute a smallest multiple number of the discharge amount per the reciprocal movement of the moving component where the smallest multiple number of the discharge amount is obtained by rounding up figures after a decimal point of a ratio of the target liquid supply amount over the discharge amount; and
a motor controller configured to control the driving source so that the moving component stops at a same position at which the moving component starts moving by making the moving component reciprocate a same number of times as the smallest multiple number of the discharge amount wherein said same position is any position which varies within the moving component's range of motion.

2. The system according to claim 1, further comprising a home position return section configured to return the moving component to a predetermined position every time the reciprocating pump is activated.

3. The system according to claim 1, wherein the setting section is configured to further set a target liquid supply time which corresponds to the target liquid supply amount; wherein the unit amount memory section is further configured to store a unit driving time which corresponds to the discharge amount; wherein the computation section is further configured to compute a smallest multiple number of the unit driving time that is obtained by rounding up figures after a decimal point of a ratio of the target liquid supply time over the unit driving time; and wherein the motor controller configured to further control the driving source so as to reciprocate the moving component a same number of times as the smallest multiple number of the unit driving time.

4. The system according to claim 1, wherein a cleaning liquid held in the trap column is replaced with a liquid supply amount equal to or larger than the target liquid supply amount every time the moving component is reciprocated the same number of times as the smallest multiple number of the discharge amount.

5. A controlling method for a preparative separation-purification system, comprising:
providing a solution container; at least one trap column; a pump housing; a moving component for reciprocating in the pump housing so as to draw a liquid into the pump housing and discharge the liquid from the pump housing, wherein the moving component starts moving from any position which varies within its range of motion; a driving source for reciprocating the moving component; and a controlling apparatus;
setting a target liquid supply amount;
computing, based on a discharge amount of the pump housing per a reciprocal movement of the moving component, a smallest multiple number of the discharge amount per the reciprocal movement of the moving component where the smallest multiple number of the discharge amount is obtained by rounding up figures after a decimal point of a ratio of the target liquid supply amount over the discharge amount; and
controlling the driving source so that the moving component stops at a same position at which the moving component starts moving by making the moving component reciprocate a same number of times as the smallest multiple number of the discharge amount, wherein said same position is any position which varies within the moving component's range of motion.

6. The method according to claim 5, wherein further setting a target liquid supply time which corresponds to the target liquid supply amount; wherein further storing a unit driving time which corresponds to the discharge amount; and wherein further computing a smallest multiple number of the unit driving time that is obtained by rounding up figures after a decimal point of a ratio of the target liquid supply time over the unit driving time; and controlling the driving source so as to reciprocate the moving component a same number of times as the smallest multiple number of the unit driving time.

7. The method according to claim 5, wherein a cleaning liquid held in the trap column is replaced with a liquid supply amount equal to or larger than the target liquid supply amount every time the moving component is reciprocated the same number of times as the smallest multiple number of the discharge amount.

8. A preparative separation-purification system comprising:
a solution container;
at least one trap column;
a reciprocating pump having a pump housing;
a moving component for reciprocating in the pump housing so as to draw a liquid into the pump housing and discharge the liquid from the pump housing, wherein the moving component starts moving from any position which varies within its range of motion;
a driving source for reciprocating the moving component; and a controlling apparatus including:
   a setting section configured to set a target liquid supply amount or a target liquid supply time which corresponds thereto;
   a unit amount memory section configured to store (i) a unit discharge amount of the reciprocating pump per a reciprocal movement of the moving component and/or (ii) a unit driving time which corresponds to the unit discharge amount;
   a computation section configured to compute a smallest multiple number (i) where the smallest multiple number is obtained by rounding up figures after a decimal point of a ratio of the target liquid supply amount over the unit discharge amount or (ii) where the smallest multiple number is obtained by rounding up figures after a decimal point of a ratio of the target liquid supply time over the unit driving time; and
   a motor controller configured to control the driving source so that the moving component stops at a same position at which the moving component starts moving by making the moving component reciprocate a same number of times as the smallest multiple number, wherein said same position is any position which varies within the moving component's range of motion.

9. The system according to claim 8, further comprising a home position return section configured to return the moving component to a predetermined position every time the reciprocating pump is activated.

10. The system according to claim 8, wherein a cleaning liquid held in the trap column is replaced with a liquid supply amount equal to or larger than the target liquid supply amount every time the moving component is reciprocated the same number of times as the smallest multiple number.

* * * * *